(12) United States Patent
Walker et al.

(10) Patent No.: US 12,387,536 B2
(45) Date of Patent: Aug. 12, 2025

(54) SYSTEMS AND METHODS FOR ASSESSING THE PERFORMANCE OF AN AUTOMATED AUTONOMOUS DRIVING EVALUATOR

(71) Applicant: Woven by Toyota, Inc., Tokyo (JP)

(72) Inventors: Daniel Walker, Atherton, CA (US); Michael Jared Benisch, Menlo Park, CA (US)

(73) Assignee: Woven by Toyota, Inc., Tokyo (JP)

( * ) Notice: Subject to any disclaimer, the term of this patent is extended or adjusted under 35 U.S.C. 154(b) by 482 days.

(21) Appl. No.: 17/842,040

(22) Filed: Jun. 16, 2022

(65) Prior Publication Data
US 2023/0410567 A1 Dec. 21, 2023

(51) Int. Cl.
*G07C 5/08* (2006.01)

(52) U.S. Cl.
CPC ......... *G07C 5/0808* (2013.01); *G07C 5/0841* (2013.01); *G07C 5/0816* (2013.01)

(58) Field of Classification Search
CPC .. G07C 5/0808; G07C 5/0841; G07C 5/0816; B60W 2556/10; B60W 50/06; B60W 60/0054; B60W 2050/0088
See application file for complete search history.

(56) References Cited

U.S. PATENT DOCUMENTS

| | | | |
|---|---|---|---|
| 11,814,070 B1 * | 11/2023 | Prioleti | B60W 30/00 |
| 2020/0082034 A1 | 3/2020 | Sholingar et al. | |
| 2020/0189590 A1 * | 6/2020 | Luo | G06N 3/08 |
| 2020/0223443 A1 * | 7/2020 | Gonzalez Aguirre | B60W 40/068 |
| 2021/0241035 A1 * | 8/2021 | Sutherland | G06V 10/7784 |
| 2021/0286925 A1 * | 9/2021 | Wyrwas | G06V 20/56 |
| 2021/0390225 A1 | 12/2021 | Yu et al. | |

(Continued)

OTHER PUBLICATIONS

K. Sung et al., "A Formal and Quantifiable Log Analysis Framework for Test Driving of Autonomous Vehicles," Sensors, Mar. 2, 2020, found at https://www.mdpi.com/1424-8220/20/5/1356/pdf.

(Continued)

*Primary Examiner* — Frederick M Brushaber
(74) *Attorney, Agent, or Firm* — Christopher G. Darrow; Darrow Mustafa PC (57) ABSTRACT

Systems and methods for assessing the performance of an automated autonomous driving evaluator are disclosed herein. One embodiment receives a driving log including at least one of raw vehicle sensor data and information derived from the raw vehicle sensor data correlated with a time index; receives ground-truth data associated with the driving log, wherein the ground-truth data includes at least one of human-initiated disengagements of an autonomous driving system and human-entered annotations indicating mistakes made by the autonomous driving system; analyzes the driving log using an automated autonomous driving evaluator to generate a report; automatically compares the report with the ground-truth data to generate a performance assessment for the automated autonomous driving evaluator; and provides the performance assessment to a development process in which the automated autonomous driving evaluator is modified based, at least in part, on the performance assessment to improve the performance of the automated autonomous driving evaluator.

21 Claims, 4 Drawing Sheets

(56) References Cited

U.S. PATENT DOCUMENTS

| | | | | |
|---|---|---|---|---|
| 2021/0406644 A1* | 12/2021 | Salman | ................... | G06N 3/045 |
| 2022/0048535 A1* | 2/2022 | Niendorf | ............... | G01C 21/165 |
| 2022/0051476 A1* | 2/2022 | Woop | ......................... | G06T 1/20 |
| 2022/0055641 A1* | 2/2022 | Wolff | ..................... | G06N 20/00 |

OTHER PUBLICATIONS

F. Reway et al., "Validity Analysis of Simulation-Based Testing Concerning Free-Space Detection in Autonomous Driving," Proceedings of the 6th International Conference on Vehicle Technology and Intelligent Transport Systems (VEHITS 2020), pp. 552-558, found at https://www.scitepress.org/Papers/2020/95737/95737.pdf.

\* cited by examiner

SYSTEMS AND METHODS FOR ASSESSING THE PERFORMANCE OF AN AUTOMATED AUTONOMOUS DRIVING EVALUATOR

TECHNICAL FIELD

The subject matter described herein generally relates to semi-autonomous and autonomous vehicles and, more particularly, to systems and methods for assessing the performance of an automated autonomous driving evaluator.

BACKGROUND

Automated verification tests for autonomous driving systems in autonomous or semi-autonomous vehicles can be an important and helpful tool in the design of such vehicles. During a test, a vehicle is either physically driven, or driving is simulated. Afterwards, the resulting time history of the test is post processed to produce additional signals, metrics, or key performance indicators (KPIs) relevant to driving performance. One aspect of these automated verification tests is sometimes referred to as an "evaluator." An evaluator is sometimes implemented as a software tool that uses the time history and any other relevant signals, metrics, or KPIs generated during post processing to determine the acceptability of some aspect of system performance. The evaluator output can include, for example, a binary pass/fail indication, an indication of the presence or absence of some key factor or issue, or a quantified or numerical score indicative of performance.

The design and implementation of an evaluator can be challenging, however, because traditional system engineering approaches to determining requirements for an evaluator do not always work well. For example, some requirements, such as obeying the speed limit and traffic signals, are easy to identify. Other requirements, such as how quickly or slowly the vehicle accelerates from a stop, how aggressively or non-aggressively the vehicle turns, and how closely the vehicle operates relative to pedestrians or other vehicles, can be more difficult to identify. Due to these difficulties, it has been observed that evaluators sometimes generate false positives and false negatives. A false positive occurs when the evaluator flags, as a mistake, behavior of the autonomous driving system that was not, in reality, a mistake. A false negative or "missed issue" occurs when the evaluator fails to identify a situation in which the autonomous driving system behaved inappropriately.

SUMMARY

An example of a system for assessing the performance of an automated autonomous driving evaluator is presented herein. The system comprises a processor and a memory storing machine-readable instructions that, when executed by the processor, cause the processor to receive a driving log that includes at least one of raw vehicle sensor data correlated with a time index and information derived from the raw vehicle sensor data correlated with the time index. The memory also stores machine-readable instructions that, when executed by the processor, cause the processor to receive ground-truth data associated with the driving log, wherein the ground-truth data includes, for one or more respective values of the time index, at least one of human-initiated disengagements of an autonomous driving system and human-entered annotations indicating mistakes made by the autonomous driving system. The memory also stores machine-readable instructions that, when executed by the processor, cause the processor to analyze the driving log using the automated autonomous driving evaluator to generate a report, wherein the automated autonomous driving evaluator is a computerized system that automatically analyzes driving logs to identify mistakes made by autonomous driving systems. The memory also stores machine-readable instructions that, when executed by the processor, cause the processor to compare automatically the report with the ground-truth data to generate a performance assessment for the automated autonomous driving evaluator. The memory also stores machine-readable instructions that, when executed by the processor, cause the processor to provide the performance assessment to a development process in which the automated autonomous driving evaluator is modified based, at least in part, on the performance assessment to improve the performance of the automated autonomous driving evaluator.

Another embodiment is a non-transitory computer-readable medium for assessing the performance of an automated autonomous driving evaluator and storing instructions that when executed by a processor cause the processor to receive a driving log that includes at least one of raw vehicle sensor data correlated with a time index and information derived from the raw vehicle sensor data correlated with the time index. The instructions also cause the processor to receive ground-truth data associated with the driving log, wherein the ground-truth data includes, for one or more respective values of the time index, at least one of human-initiated disengagements of an autonomous driving system and human-entered annotations indicating mistakes made by the autonomous driving system. The instructions also cause the processor to analyze the driving log using the automated autonomous driving evaluator to generate a report, wherein the automated autonomous driving evaluator is a computerized system that automatically analyzes driving logs to identify mistakes made by autonomous driving systems. The instructions also cause the processor to compare automatically the report with the ground-truth data to generate a performance assessment for the automated autonomous driving evaluator. The instructions also cause the processor to provide the performance assessment to a development process in which the automated autonomous driving evaluator is modified based, at least in part, on the performance assessment to improve the performance of the automated autonomous driving evaluator.

In another embodiment, a method of assessing the performance of an automated autonomous driving evaluator is disclosed. The method comprises receiving a driving log that includes at least one of raw vehicle sensor data correlated with a time index and information derived from the raw vehicle sensor data correlated with the time index. The method also includes receiving ground-truth data associated with the driving log, wherein the ground-truth data includes, for one or more respective values of the time index, at least one of human-initiated disengagements of an autonomous driving system and human-entered annotations indicating mistakes made by the autonomous driving system. The method also includes analyzing the driving log using an automated autonomous driving evaluator to generate a report, wherein the automated autonomous driving evaluator is a computerized system that automatically analyzes driving logs to identify mistakes made by autonomous driving systems. The method also includes comparing automatically the report with the ground-truth data to generate a performance assessment for the automated autonomous driving evaluator. The method also includes providing the performance assessment to a development process in which the automated autonomous driving evaluator is modified based, at least in part, on the performance assessment to improve the performance of the automated autonomous driving evaluator.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Various embodiments of an autonomous driving evaluator assessment system disclosed herein improve the performance of an automated autonomous driving evaluator (hereinafter sometimes referred to as simply an "evaluator") through automated techniques that make use of ground-truth data generated with the assistance of a human observer. In embodiments, an automatically generated performance assessment of an evaluator is provided to a development process in which the evaluator is modified based, at least in part, on the performance assessment to improve the performance of the evaluator. Thus, the various embodiments disclosed herein provide an automated way to "evaluate the evaluator" and, thereby, to improve the evaluator.

In some embodiments, driving logs are produced by autonomous or semi-autonomous vehicles (hereinafter sometimes referred to as simply "vehicles") as they are operated on roadways. The vehicles are controlled by a particular autonomous driving system undergoing testing or evaluation. In these embodiments, a human observer riding in a given vehicle assists in generating ground-truth data as a driving log is being recorded by disengaging autonomous driving, when a problem arises with the autonomous driving system that is serious enough to warrant the human observer taking over control of the vehicle (e.g., the autonomous driving system is about to make a serious mistake that could impact safety). These disengagements are noted with their corresponding time stamps in the ground-truth data to correlate the disengagements temporally with the driving log. For less serious mistakes, the human observer can enter annotations that are automatically time stamped to correlate the annotations temporally with the driving log, and those annotations also become part of the ground-truth data. In other embodiments, the human observer generates the ground-truth data by entering annotations regarding mistakes made by an autonomous driving system as a driving log from that autonomous driving system is being replayed in a simulator after the fact. In still other embodiments, the driving logs are generated synthetically (e.g., by a computing system), and a human observer playing back the synthetic driving logs generates ground-truth data by entering annotations indicating that, at particular time indexes in the driving logs, the simulated autonomous driving system behaved inappropriately (i.e., committed driving errors).

In various embodiments, once driving logs and associated ground-truth data have been generated, the driving logs are analyzed by an automated autonomous driving evaluator whose performance is to be assessed. The automated autonomous driving evaluator generates a report that attempts to identify mistakes made by an autonomous driving system. An autonomous driving evaluator assessment system then automatically compares the report output by the evaluator with the ground-truth data discussed above to generate a performance assessment for the evaluator. In some embodiments, that performance assessment is provided to a development process in which the evaluator is modified based, at least in part, on the performance assessment to improve the performance of the evaluator.

In some embodiments, the evaluator is designed to identify mistakes pertaining to a particular aspect of autonomous driving (e.g., lane positioning, accelerating, braking/decelerating, cornering/turning, changing lanes, etc.). In some embodiments, the evaluator is rule-based (e.g., an expert system). In other embodiments, the evaluator is machine-learning-based, employing one or more trained neural networks to identify mistakes made by an autonomous driving system.

In one embodiment, driving logs are recorded in an autonomous vehicle operating in a shadow mode in which the autonomous driving system simulates controlling the autonomous vehicle while the autonomous vehicle is, in reality, being controlled in a manual driving mode by a human operator. Simulated actions taken by the shadow-mode autonomous driving system that deviate in a predetermined manner from actions taken by the human operator (presumed to be correct) are automatically annotated as mistakes in the ground-truth data. In a different embodiment, an autonomous driving system operating in shadow mode recognizes a situation in which it believes it cannot select a "mistake-free" driving policy. For example, the autonomous driving system might flag that it cannot avoid a collision or a lane departure. Such determinations can also become part of the ground-truth data.

Figure 1:
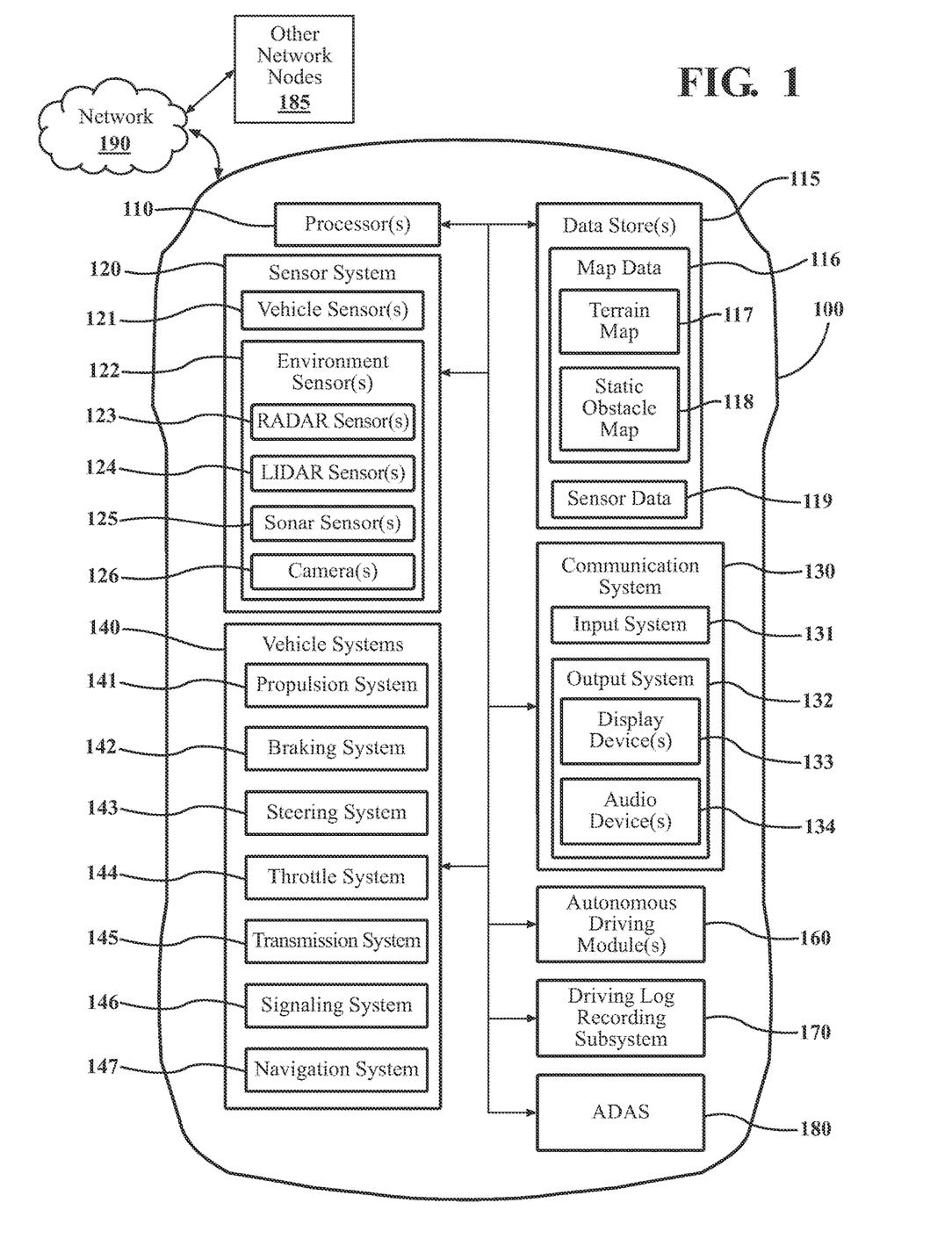
FIG. 1 illustrates one embodiment of a vehicle that can be used to generate driving logs and ground-truth data, in accordance with various illustrative embodiments of an autonomous driving evaluator assessment system.

Referring to FIG. 1, it depicts a vehicle 100 that can be used to generate driving logs and ground-truth data, in accordance with various illustrative embodiments of an autonomous driving evaluator assessment system. As used herein, a "vehicle" is any form of motorized transport. One example of a "vehicle," without limitation, is an automobile.

In embodiments, vehicle 100 includes an autonomous driving system that enables vehicle 100 to operate in a semi-autonomous or autonomous driving mode at least some of the time. For example, in some embodiments, vehicle 100 can operate at a high or total level of autonomy (e.g., what the automotive industry refers to as autonomy Levels 3-5). In other embodiments, vehicle 100 can operate in a semi-autonomous driving mode by virtue of features such as adaptive cruise-control, automatic lane-change assistance, and automatic parking assistance. In still other embodiments, vehicle 100 can operate in a semi-autonomous driving mode via an intelligent driving assistance system such as an Advanced Driver-Assistance System (ADAS). In some embodiments, the ADAS can intervene (e.g., temporarily take control of acceleration/deceleration and/or steering) to avoid a collision or other accident. In still other embodiments, vehicle 100 may be driven manually by a human driver (e.g., when the autonomous driving system of vehicle 100 is operating in a background, simulated shadow mode).

As discussed further below, in some embodiments, driving logs are generated synthetically (e.g., by a computing system). In such an embodiment, a simulated vehicle can substitute for an actual vehicle 100.

The vehicle 100 also includes various elements. It will be understood that, in various implementations, it may not be necessary for the vehicle 100 to have all the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. Some of the possible elements of the vehicle 100 are shown in FIG. 1. However, a description of many of the elements in FIG. 1 will be provided after the discussion of FIGS. 2-4 for purposes of brevity of this description. As shown in FIG. 1, vehicle 100 is equipped with an autonomous driving system that includes autonomous driving module(s) 160 and/or an ADAS 180. A number of other elements support the autonomous driving system of vehicle 100, as explained further below.

Vehicle 100 also includes a driving log recording subsystem 170 to record/store driving logs and, in some embodiments, associated ground-truth data. Herein, a "driving log" includes raw vehicle sensor data correlated with a time index, information derived from the raw vehicle sensor data correlated with the time index, or both. In embodiments in which driving logs are synthetically generated (e.g., by a simulated vehicle), the "raw vehicle sensor data" and/or the "information derived from the raw vehicle sensor data" can also be simulated (synthetically generated). Examples of various types of vehicle sensors and vehicle sensor data are discussed in greater detail below. As also discussed further below, driving log recording subsystem 170 can include features that enable a human observer riding in vehicle 100 to generate ground-truth data associated with a driving log while vehicle 100 is operating in an autonomous driving mode and while the driving log is being recorded. More specifically, driving log recording subsystem 170 can be configured to automatically record disengagements and their associated time indexes. A disengagement occurs when the human observer in vehicle 100 activates a button or other control to disengage the autonomous driving system and take over control of vehicle 100 due to a problem with the autonomous driving system (e.g., the autonomous driving system is about to make a mistake that could impact safety, or the autonomous driving system is unable to continue controlling vehicle 100 due to ambiguity or uncertainty in its perception systems). It should be noted that not all disengagements necessarily indicate undesirable vehicle behavior. This is discussed further below. Driving log recording subsystem 170 also includes features enabling the human observer in vehicle 100 to enter automatically time-indexed annotations or notations regarding mistakes made by the autonomous driving system as they occur. Those annotations also become part of the ground-truth data along with the time-indexed disengagements. For example, in some embodiments, the human observer uses a mobile computing device (e.g., a smartphone or tablet computer) to enter annotations that are transmitted, via a wired or wireless communication link, to driving log recording subsystem 170, which stores the annotations and their associated time stamps as ground-truth data.

In some embodiments, the ground-truth data includes the driving log (or a more streamlined version of the driving log with less or no raw sensor data) plus the added time-indexed disengagements and annotations discussed above. In other embodiments, the ground-truth data includes a list of the time-indexed disengagements and annotations, and the ground-truth data is separate from the driving log with which it is associated.

Herein, a "mistake" committed by the autonomous driving system of a vehicle 100 can be any of a wide variety of driving errors-any that a human driver might commit. Examples include, without limitation, swerving, accelerating too aggressively, braking too suddenly or aggressively, speeding, failing to stop for a red traffic light, drifting across a lane boundary, weaving or wandering around within a lane, driving the wrong direction on a one-way street, and driving too close to pedestrians or other vehicles.

Sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include Controller-Area-Network (CAN) sensors that output, for example, speed and steering-angle data pertaining to vehicle 100. Sensor system 120 can also include one or more environment sensors 122. Environment sensors 122 generally include, without limitation, radar sensor(s) 123, Light Detection and Ranging (LIDAR) sensor(s) 124, sonar sensor(s) 125, and camera(s) 126. One or more of these various types of environment sensors 122 can be used to detect objects (e.g., external road agents such as other vehicles, bicyclists, motorcyclists, pedestrians, and animals) and, in other respects, understand the environment surrounding vehicle 100 and its associated traffic situations and conditions. This process is sometimes referred to as "traffic-situation understanding" or "scene understanding."

Raw sensor data from one or more of the various types of vehicle sensors 121 and environment sensors 122 discussed above can be included in a driving log recorded by driving log recording subsystem 170. As discussed above, additionally or alternatively, a driving log can include various types of information derived or inferred from raw sensor data. As also discussed above, in embodiments in which driving logs are synthetically generated, raw vehicle sensor data and/or information derived therefrom can also be synthetically generated.

As shown in FIG. 1, vehicle 100, in some embodiments, can communicate with other network nodes 185 (e.g., connected vehicles, cloud servers, edge servers, roadside units, infrastructure) via a network 190. In some embodiments, network 190 includes the Internet.

Figure 2:
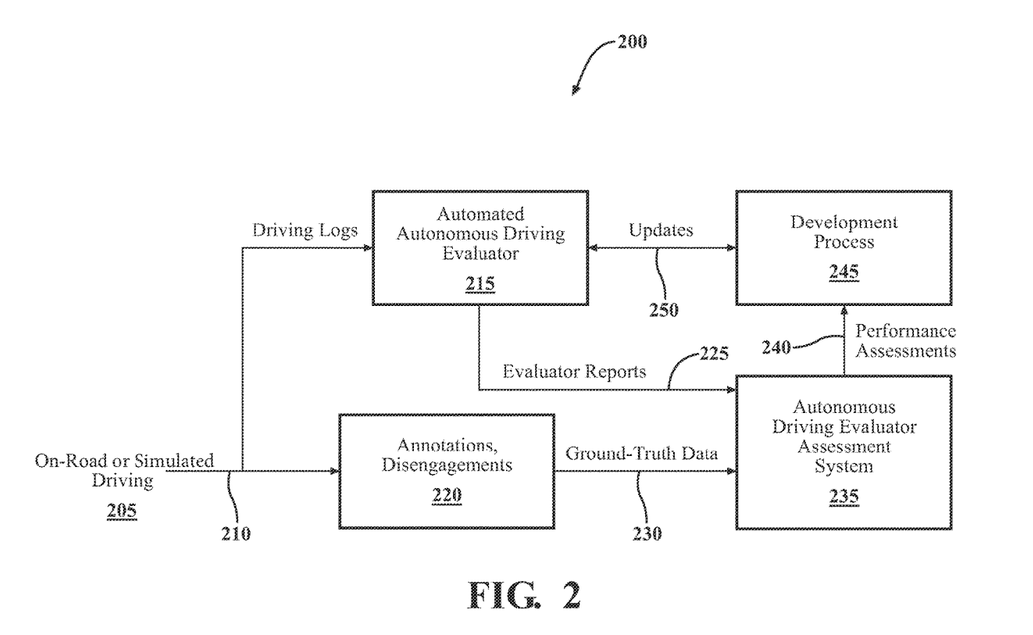
FIG. 2 is a diagram of an environment in which various illustrative embodiments of an autonomous driving evaluator assessment system can be deployed.

FIG. 2 is a diagram of an environment 200 in which various illustrative embodiments of an autonomous driving evaluator assessment system can be deployed. As shown in FIG. 2, environment 200 includes on-road or simulated driving 205 to generate driving logs 210. That is, as discussed above, in some embodiments, one or more vehicles 100 engage in on-road driving to produce the driving logs 210. In other embodiments, the driving logs 210 are generated synthetically (e.g., by a computing system). For example, in some embodiments, a simulated vehicle is used to generate the synthetic driving logs. The driving logs 210 are input to an automated autonomous driving evaluator 215 whose performance is to be assessed by an autonomous driving evaluator assessment system 235. As discussed above, a human observer assists in generating ground-truth data 230 through annotations and disengagements 220, either during autonomous or semi-autonomous driving of the vehicles 100 as the driving logs 210 are being recorded or after the fact as the driving logs 210 are replayed in a simulator. Automated autonomous driving evaluator 215 outputs evaluator reports 225 in which the automated autonomous driving evaluator 215 attempts to identify mistakes made by the autonomous driving system associated with the input driving logs 210. Such a report 225 can include, for example, a list of mistakes made by the autonomous driving system and their associated time indexes temporally correlating the alleged mistakes with the corresponding driving log 210. In some embodiments, an evaluator report 225 includes both a start time and a stop time for each alleged mistake made by the autonomous driving system. Thus, the difference between the start and stop times indicates a duration of the alleged mistake in question. In some embodiments, the automated autonomous driving evaluator 215 assigns a severity score to each alleged mistake to indicate how serious that particular mistake is.

As mentioned above, not all disengagements necessarily indicate erroneous vehicle behavior. In some embodiments, the ground-truth data 230, as part of a further triage/annotation process (not shown in FIG. 2), is reviewed by a human analyst. During such a review, any irrelevant disengagements can be removed from the ground-truth data 230, and any incorrect annotations can be removed or corrected.

An evaluator report 225 output by the automated autonomous driving evaluator 215 and the ground-truth data 230 associated with the corresponding driving log 210 are input to the autonomous driving evaluator assessment system 235, which compares the evaluator report 225 with the ground-truth data 230 to generate a performance assessment 240 for the automated autonomous driving evaluator 215.

Depending on the particular embodiment, the performance assessment 240 can include one or more of the following kinds of information: (1) false positives, (2) false negatives, (3) true positives, and (4) true negatives. A "false positive" occurs when the evaluator report 225 from the automated autonomous driving evaluator 215 indicates a mistake made by the autonomous driving system that was not, in reality, a mistake. That is, the ground-truth data 230, which is presumed to be correct, does not indicate a mistake at the time index in question. A "false negative" occurs when the evaluator report 225 does not indicate a mistake where a mistake should have been noted. That is, the ground-truth data 230 indicates a mistake at the time index in question, but the evaluator report 225 does not. A "false negative" may thus be considered a "missed issue." A "true positive" occurs when the evaluator report 225 correctly identifies a mistake made by the autonomous driving system that produced the relevant driving log 210. That is, the ground-truth data 230 indicates a mistake at a particular time index, and the evaluator report 225 also identifies that mistake. A "true negative" occurs when the evaluator report 225 correctly reflects, through the absence of any indication of a mistake, that no mistake was made at a particular time index or over a particular segment of the applicable driving log 210. That is, the ground-truth data 230 does not indicate a mistake at a particular time index or over a particular segment of the driving log 210, and neither does the evaluator report 225.

As shown in FIG. 2, in some embodiments, the performance assessments 240 output by autonomous driving evaluator assessment system 235 are provided to a development process 245 in which the automated autonomous driving evaluator 215 is modified (updates 250) based, at least in part, on the performance assessments 240 to improve the performance of the automated autonomous driving evaluator 215. In some embodiments, this means one or more engineers associated with the development process 245 modify the design of automated autonomous driving evaluator 215 to improve its performance (i.e., to improve its ability to correctly identify mistakes made by an autonomous driving system). In other embodiments, the modification of automated autonomous driving evaluator 215 can be automated through a rule-based or machine-learning-based algorithm. In some cases, the resulting improvements might involve increased speed and/or efficiency in analyzing driving logs 210. Thus, one important result of deploying the automated autonomous driving evaluator assessment system 235 as described above is that the performance of an automated autonomous driving evaluator 215, a computerized system including a combination of hardware and software, is improved. This ultimately serves the practical and desirable purpose of improving the quality and performance of autonomous driving systems deployed in vehicles 100 because a more accurate automated autonomous driving evaluator 215 supports more rapid, efficient, and thorough corrections in and improvements to the autonomous driving systems.

Figure 3:
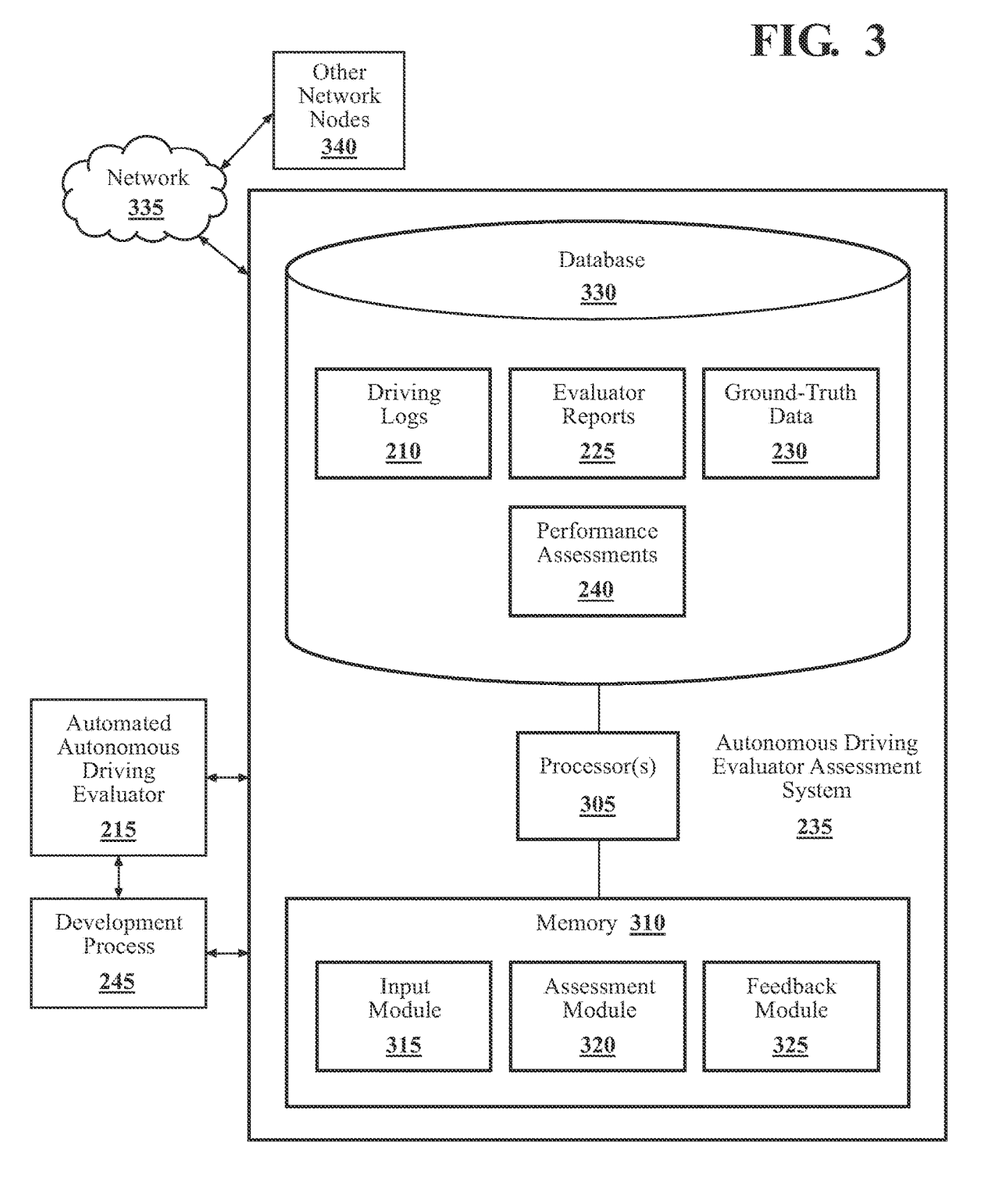
FIG. 3 is a block diagram of an autonomous driving evaluator assessment system, in accordance with an illustrative embodiment of the invention.

FIG. 3 is a block diagram of an autonomous driving evaluator assessment system 235, in accordance with an illustrative embodiment of the invention. As shown in FIG. 3, autonomous driving evaluator assessment system 235 includes one or more processors 305. In some embodiments, autonomous driving evaluator assessment system 235 is implemented in a server or workstation computer. In this embodiment, memory 310 stores an input module 315, an assessment module 320, and a feedback module 325. The memory 310 is a random-access memory (RAM), read-only memory (ROM), a hard-disk drive, a flash memory, or other suitable memory for storing the modules 315, 320, and 325. The modules 315, 320, and 325 are, for example, computer-readable instructions that, when executed by the one or more processors 305, cause the one or more processors 305 to perform the various functions disclosed herein.

Autonomous driving evaluator assessment system 235 can store various kinds of data in a database 330. Examples include driving logs 210, ground-truth data 230, evaluator reports 225, and performance assessments 240, all of which are discussed above in connection with FIG. 2. As also depicted in FIG. 3, autonomous driving evaluator assessment system 235 interacts either locally or remotely with an automated autonomous driving evaluator 215 and with a development process 245, as discussed above in connection with FIG. 2. As shown in FIG. 3, autonomous driving evaluator assessment system 235 can communicate with one or more other network nodes 340 (e.g., other servers, client computers, etc.) via network 335.

Input module 315 generally includes instructions that when executed by the one or more processors 305 cause the one or more processors 305 to receive a driving log 210 that includes raw vehicle sensor data correlated with a time index, information derived from the raw vehicle sensor data correlated with the time index, or both. Input module 315 also includes instructions that when executed by the one or more processors 305 cause the one or more processors 305 to receive ground-truth data 230 associated with the driving log 210. The ground-truth data 230 includes, for one or more respective values of the time index, human-initiated disengagements of the autonomous driving system, human-entered annotations indicating mistakes made by the autonomous driving system, or both.

As discussed above, in some embodiments, the driving logs 210 are produced (recorded, stored) by autonomous or semi-autonomous vehicles 100 as they are operated on roadways. The vehicles 100 are controlled by a particular autonomous driving system that is undergoing testing or evaluation. As also discussed above, in these embodiments, a human observer riding in a given vehicle 100 assists in generating ground-truth data 230 as a driving log 210 is being recorded by disengaging autonomous driving, when a problem arises with the autonomous driving system that is serious enough to warrant the human observer taking over control of the vehicle 100 (e.g., the autonomous driving system is about to make a mistake that could result in a collision or other accident). These disengagements are noted with their corresponding time stamps in the ground-truth data 230 to correlate the disengagements temporally with the driving log 210. For less serious mistakes, the human observer can enter annotations that are automatically time stamped to correlate the annotations temporally with the driving log 210, and those annotations also become part of the ground-truth data 230. In other embodiments, the human observer generates the ground-truth data 230 by entering annotations regarding mistakes made by an autonomous driving system as a driving log 210 from that autonomous driving system is being replayed after the fact in a simulator. As also discussed above, in still other embodiments, the driving logs 210 are generated synthetically (e.g., by a computing system), and a human observer playing back the synthetic driving logs generates ground-truth data by entering annotations indicating that, at particular time indexes in the driving logs 210, the simulated autonomous driving system behaved inappropriately (i.e., committed driving errors).

As mentioned above, in one embodiment, driving logs 210 are recorded in an autonomous vehicle 100 operating in a shadow mode in which the autonomous driving system in the vehicle simulates controlling the autonomous vehicle 100 while the autonomous vehicle 100 is, in reality, being controlled in a manual driving mode by a human operator. Simulated actions taken by the shadow-mode autonomous driving system that deviate in a predetermined manner from actions taken by the human operator are automatically annotated as mistakes in the ground-truth data 230. In some embodiments, the predetermined manner in which errant actions deviate from the human operator's actions is based on a threshold test. That is, when the decisions of the shadow-mode autonomous driving system deviate from the human operator's decisions by an amount that exceeds a predetermined threshold, an annotation of a mistake and its associated time index are saved in the ground-truth data 230. As discussed above, in a different embodiment, an autonomous driving system operating in shadow mode recognizes a situation in which it believes it cannot select a "mistake-free" driving policy. For example, the autonomous driving system might flag that it cannot avoid a collision or a lane departure. Such determinations can also become part of the ground-truth data 230.

Assessment module 320 generally includes instructions that when executed by the one or more processors 305 cause the one or more processors 305 to analyze the driving log 210 using the automated autonomous driving evaluator 215 to generate a report 225. As discussed above, the automated autonomous driving evaluator 215 is a computerized system that automatically analyzes driving logs, whether real-world or synthetic, to identify mistakes made by autonomous driving systems. In some embodiments, the automated autonomous driving evaluator 215 employs a rule-based (expert-system-style) algorithm to identify the mistakes. In other embodiments, the automated autonomous driving evaluator 215 employs a machine-learning-based methodology that includes one or more neural networks. As also discussed above, an evaluator report 225 output by automated autonomous driving evaluator 215 includes ostensible mistakes committed by the autonomous driving system and their corresponding time indexes, permitting the evaluator report 225 to be related temporally to the driving log 210 that was analyzed.

Assessment module 320 also includes instructions that when executed by the one or more processors 305 cause the one or more processors 305 to automatically compare the report 225 with the ground-truth data 230 to generate a performance assessment 240 for the automated autonomous driving evaluator 215. As discussed above, the performance assessment 240 can include one or more of the following kinds of information: (1) false positives, (2) false negatives, (3) true positives, and (4) true negatives. The definitions of these terms are provided above.

Feedback module 325 generally includes instructions that when executed by the one or more processors 305 cause the one or more processors 305 to provide the performance assessment 240 to a development process 245 in which the automated autonomous driving evaluator 215 is modified based, at least in part, on the performance assessment 240 to improve the performance of the automated autonomous driving evaluator 215. As discussed above, in some embodiments, this means one or more engineers associated with the development process 245 modify the design of automated autonomous driving evaluator 215 to improve its performance (i.e., to improve its ability to correctly identify mistakes made by an autonomous driving system). In other embodiments, the modification of the evaluator 215 can be automated through a rule-based or machine-learning-based algorithm. In some cases, the resulting improvements might involve increased speed and/or efficiency in analyzing driving logs 210. Thus, one important result of deploying the automated autonomous driving evaluator assessment system 235 as described above is that the performance of an automated autonomous driving evaluator 215, a computerized system including a combination of hardware and software, is improved. This ultimately serves the practical and desirable purpose of improving the quality and performance of autonomous driving systems deployed in vehicles 100 because a more accurate automated autonomous driving evaluator 215 supports more rapid, efficient, and thorough corrections in and improvements to the autonomous driving systems installed in vehicles 100.

Figure 4:
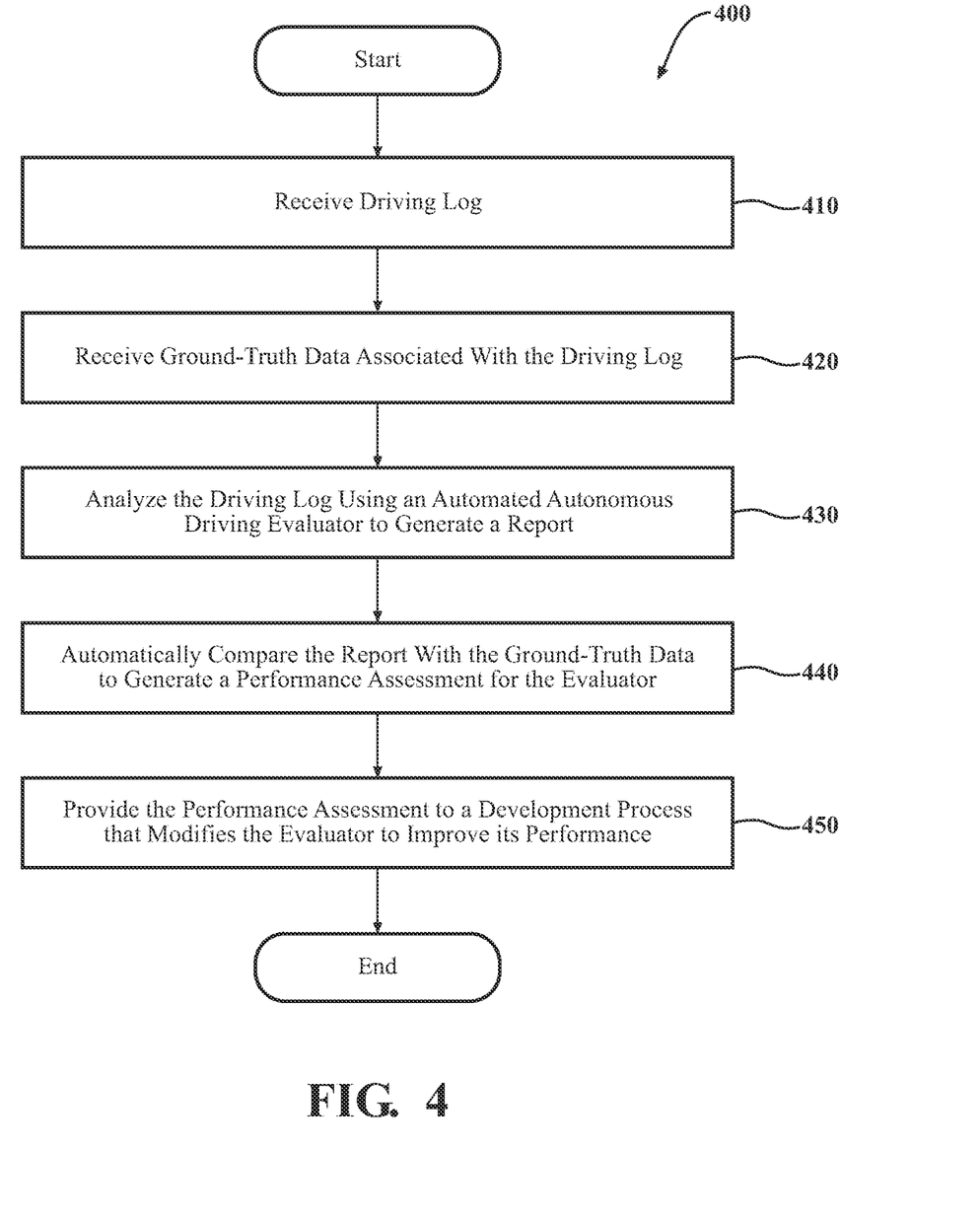
FIG. 4 is a flowchart of a method of assessing the performance of an automated autonomous driving evaluator, in accordance with an illustrative embodiment of the invention.

FIG. 4 is a flowchart of a method 400 of assessing the performance of an automated autonomous driving evaluator 215, in accordance with an illustrative embodiment of the invention. Method 400 will be discussed from the perspective of the autonomous driving evaluator assessment system 235 in FIGS. 2 and 3. While method 400 is discussed in combination with autonomous driving evaluator assessment system 235, it should be appreciated that method 400 is not limited to being implemented within autonomous driving evaluator assessment system 235, but autonomous driving evaluator assessment system 235 is instead one example of a system that may implement method 400.

At block 410, input module 315 receives a driving log 210 that includes raw vehicle sensor data correlated with a time index, information derived from the raw vehicle sensor data correlated with the time index, or both. As discussed above, in some embodiments, the driving logs 210 are produced (recorded, stored) by autonomous or semi-autonomous vehicles 100 as they are operated on roadways. As also discussed above, in other embodiments, the driving logs 210 are generated synthetically (e.g., by a computing system).

At block 420, input module 315 receives ground-truth data 230 associated with the driving log 210. As explained above, the ground-truth data 230 includes, for one or more respective values of the time index, human-initiated disengagements of an autonomous driving system, human-entered annotations indicating mistakes made by the autonomous driving system, or both. As also discussed above, in some embodiments, a human observer riding in a given vehicle 100 assists in generating ground-truth data 230 as a driving log 210 is being recorded by disengaging autonomous driving, when a problem arises with the autonomous driving system that is serious enough to warrant the human observer taking over control of the vehicle 100 (e.g., the autonomous driving system is about to make a mistake that could result in a collision or other accident). These disengagements are noted with their corresponding time stamps in the ground-truth data 230 to correlate the disengagements temporally with the driving log 210. For less serious mistakes, the human observer can enter annotations that are automatically time stamped to correlate the annotations temporally with the driving log 210, and those annotations also become part of the ground-truth data 230. In other embodiments, the human observer generates the ground-truth data 230 by entering annotations regarding mistakes made by an autonomous driving system as a driving log 210 from that autonomous driving system is being replayed in a simulator. As also discussed above, in still other embodiments, the driving logs 210 are generated synthetically (e.g., by a computing system), and a human observer playing back the synthetic driving logs generates ground-truth data by entering annotations indicating that, at particular time indexes in the driving logs 210, the simulated autonomous driving system behaved inappropriately (i.e., committed driving errors).

As mentioned above, in one embodiment, driving logs 210 are recorded in an autonomous vehicle 100 operating in a shadow mode in which the autonomous driving system in the vehicle simulates controlling the autonomous vehicle 100 while the autonomous vehicle 100 is, in reality, being controlled in a manual driving mode by a human operator. Simulated actions taken by the shadow-mode autonomous driving system that deviate in a predetermined manner from actions taken by the human operator are automatically annotated as mistakes in the ground-truth data 230. As also discussed above, in some embodiments, the predetermined manner in which errant actions deviate from the human operator's actions is based on a threshold test. For example, when the decisions of the shadow-mode autonomous driving system deviate from the human operator's decisions by an amount that exceeds a predetermined threshold, a mistake and its associated time index are saved in the ground-truth data 230. As also discussed above, in a different embodiment, an autonomous driving system operating in shadow mode recognizes a situation in which it believes it cannot select a "mistake-free" driving policy. For example, the autonomous driving system might flag that it cannot avoid a collision or a lane departure. Such determinations can also become part of the ground-truth data 230.

At block 430, assessment module 320 analyzes the driving log 210 using the automated autonomous driving evaluator 215 to generate a report 225. As explained above, the automated autonomous driving evaluator 215 is a computerized system that automatically analyzes driving logs 210, whether real-world or synthetic, to identify mistakes made by an autonomous driving system. In some embodiments, the automated autonomous driving evaluator 215 employs a rule-based (expert-system-style) algorithm to identify the mistakes. In other embodiments, the automated autonomous driving evaluator 215 employs a machine-learning-based methodology that includes one or more neural networks. As also discussed above, the evaluator report 225 output by the automated autonomous driving evaluator 215 includes ostensible mistakes committed by the autonomous driving system and their corresponding time indexes, permitting the evaluator report 225 to be related temporally to the driving log 210 that was analyzed.

At block 440, assessment module 320 automatically compares the report 225 with the ground-truth data 230 to generate a performance assessment 240 for the automated autonomous driving evaluator 215. As discussed above, the performance assessment 240 can include one or more of the following kinds of information: (1) false positives, (2) false negatives, (3) true positives, and (4) true negatives. The definitions of these terms are discussed above.

At block 450, feedback module 325 provides the performance assessment 240 to a development process 245 in which the automated autonomous driving evaluator 215 is modified based, at least in part, on the performance assessment 240 to improve the performance of the automated autonomous driving evaluator 215. As discussed above, in some embodiments, this means one or more engineers associated with the development process 245 modify the design of automated autonomous driving evaluator 215 to improve its performance (i.e., to improve its ability to correctly identify mistakes made by an autonomous driving system). In other embodiments, the modification of automated autonomous driving evaluator 215 can be automated through a rule-based or machine-learning-based algorithm. In some cases, the resulting improvements might involve increased speed and/or efficiency in analyzing driving logs 210. Thus, one important result of deploying the automated autonomous driving evaluator assessment system 235 as described above is that the performance of an automated autonomous driving evaluator 215, a computerized system including a combination of hardware and software, is improved. This ultimately serves the practical and desirable purpose of improving the quality and performance of autonomous driving systems deployed in vehicles 100 because a more accurate automated autonomous driving evaluator 215 supports more rapid, efficient, and thorough corrections in and improvements to the autonomous driving systems installed in vehicles 100.

For simplicity, method 400 has been described in terms of the processing that occurs for a single driving log 210. In practice, many driving logs 210 can be used to assess an automated autonomous driving evaluator 215, and a large database can be collected containing positive and negative examples of erroneous and correct driving behavior, respectively, by various autonomous driving systems. The associated ground-truth data can also be stored in such a database along with the driving logs 210.

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with ORUs, or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/or orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the vehicle 100. The one or more processors 110 and/or the autonomous driving module(s) 160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-4, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. The term "module," as used herein, is not intended, under any circumstances, to invoke interpretation of the appended claims under 35 U.S.C. § 112(f).

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for assessing performance of an automated autonomous driving evaluator, the system comprising:
a processor; and
a memory storing machine-readable instructions that, when executed by the processor, cause the processor to:
receive a driving log that includes at least one of raw vehicle sensor data correlated with a time index and information derived from the raw vehicle sensor data correlated with the time index;
receive ground-truth data associated with the driving log, wherein the ground-truth data includes, for one or more respective values of the time index, at least one of human-initiated disengagements of an autonomous driving system and human-entered annotations indicating mistakes made by the autonomous driving system;
analyze the driving log using the automated autonomous driving evaluator to generate a report, wherein the automated autonomous driving evaluator is a computerized system that automatically analyzes driving logs to identify mistakes made by autonomous driving systems;
compare automatically the report with the ground-truth data to generate a performance assessment for the automated autonomous driving evaluator; and
provide the performance assessment to a development process in which the automated autonomous driving evaluator is modified based, at least in part, on the performance assessment to improve the performance of the automated autonomous driving evaluator;
wherein a vehicle is controlled using an autonomous driving system that has been corrected based on an analysis by the modified automated autonomous driving evaluator.

2. The system of claim 1, wherein:
the ground-truth data is generated in an autonomous vehicle controlled by the autonomous driving system as the driving log is being recorded; and
a human observer riding in the autonomous vehicle initiates the human-initiated engagements and enters the human-entered annotations.

3. The system of claim 1, wherein the ground-truth data is generated while the driving log is being replayed in a simulator by a human observer who enters the human-entered annotations.

4. The system of claim 1, wherein the automated autonomous driving evaluator is designed to identify mistakes pertaining to a particular predetermined aspect of autonomous driving.

5. The system of claim 1, wherein the performance assessment for the automated autonomous driving evaluator includes one or more of false positives, false negatives, true positives, and true negatives.

6. The system of claim 1, wherein the driving log is recorded in an operating autonomous vehicle.

7. The system of claim 1, wherein the driving log is generated synthetically by a computing system.

8. The system of claim 1, wherein the automated autonomous driving evaluator is one of rule-based and machine-learning-based.

9. A system, comprising:
a processor; and
a memory storing machine-readable instructions that, when executed by the processor, cause the processor to:
receive a driving log that includes at least one of raw vehicle sensor data correlated with a time index and information derived from the raw vehicle sensor data correlated with the time index, wherein the driving log is recorded in an autonomous vehicle operating in a shadow mode in which an autonomous driving system simulates controlling the autonomous vehicle while the autonomous vehicle is being controlled by a human operator;

receive ground-truth data associated with the driving log, wherein simulated actions taken by the autonomous driving system in the shadow mode that deviate in a predetermined manner from actions taken by the human operator are automatically annotated as mistakes in the ground-truth data;

analyze the driving log using the automated autonomous driving evaluator to generate a report, wherein the automated autonomous driving evaluator is a computerized system that automatically analyzes driving logs to identify mistakes made by autonomous driving systems;

compare automatically the report with the ground-truth data to generate a performance assessment for the automated autonomous driving evaluator; and provide the performance assessment to a development process in which the automated autonomous driving evaluator is modified based, at least in part, on the performance assessment to improve the performance of the automated autonomous driving evaluator;

wherein a vehicle is controlled using an autonomous driving system that has been corrected based on an analysis by the modified automated autonomous driving evaluator.

10. A non-transitory computer-readable medium for assessing performance of an automated autonomous driving evaluator and storing instructions that, when executed by a processor, cause the processor to:

receive a driving log that includes at least one of raw vehicle sensor data correlated with a time index and information derived from the raw vehicle sensor data correlated with the time index;

receive ground-truth data associated with the driving log, wherein the ground-truth data includes, for one or more respective values of the time index, at least one of human-initiated disengagements of an autonomous driving system and human-entered annotations indicating mistakes made by the autonomous driving system;

analyze the driving log using the automated autonomous driving evaluator to generate a report, wherein the automated autonomous driving evaluator is a computerized system that automatically analyzes driving logs to identify mistakes made by autonomous driving systems;

compare automatically the report with the ground-truth data to generate a performance assessment for the automated autonomous driving evaluator; and provide the performance assessment to a development process in which the automated autonomous driving evaluator is modified based, at least in part, on the performance assessment to improve the performance of the automated autonomous driving evaluator;

wherein a vehicle is controlled using an autonomous driving system that has been corrected based on an analysis by the modified automated autonomous driving evaluator.

11. The non-transitory computer-readable medium of claim 10, wherein:

the ground-truth data is generated in an autonomous vehicle controlled by the autonomous driving system as the driving log is being recorded; and a human observer riding in the autonomous vehicle initiates the human-initiated engagements and enters the human-entered annotations.

12. A method, comprising:

receiving a driving log that includes at least one of raw vehicle sensor data correlated with a time index and information derived from the raw vehicle sensor data correlated with the time index;

receiving ground-truth data associated with the driving log, wherein the ground-truth data includes, for one or more respective values of the time index, at least one of human-initiated disengagements of an autonomous driving system and human-entered annotations indicating mistakes made by the autonomous driving system;

analyzing the driving log using an automated autonomous driving evaluator to generate a report, wherein the automated autonomous driving evaluator is a computerized system that automatically analyzes driving logs to identify mistakes made by autonomous driving systems;

comparing automatically the report with the ground-truth data to generate a performance assessment for the automated autonomous driving evaluator; and providing the performance assessment to a development process in which the automated autonomous driving evaluator is modified based, at least in part, on the performance assessment to improve the performance of the automated autonomous driving evaluator;

wherein a vehicle is controlled using an autonomous driving system that has been corrected based on an analysis by the modified automated autonomous driving evaluator.

13. The method of claim 12, wherein:

the ground-truth data is generated in an autonomous vehicle controlled by the autonomous driving system as the driving log is being recorded; and a human observer riding in the autonomous vehicle initiates the human-initiated engagements and enters the human-entered annotations.

14. The method of claim 12, wherein the ground-truth data is generated while the driving log is being replayed in a simulator by a human observer who enters the human-entered annotations.

15. The method of claim 12, wherein the automated autonomous driving evaluator is designed to identify mistakes pertaining to a particular predetermined aspect of autonomous driving.

16. The method of claim 12, wherein the performance assessment for the automated autonomous driving evaluator includes one or more of false positives, false negatives, true positives, and true negatives.

17. The method of claim 12, wherein the driving log is recorded in an operating autonomous vehicle.

18. The method of claim 12, wherein the driving log is generated synthetically by a computing system.

19. The method of claim 12, wherein the automated autonomous driving evaluator is one of rule-based and machine-learning-based.

20. A method, comprising:

receiving a driving log that includes at least one of raw vehicle sensor data correlated with a time index and information derived from the raw vehicle sensor data correlated with the time index, wherein the driving log is recorded in an autonomous vehicle operating in a shadow mode in which an autonomous driving system simulates controlling the autonomous vehicle while the autonomous vehicle is being controlled by a human operator;

receiving ground-truth data associated with the driving log, wherein simulated actions taken by the autonomous driving system in the shadow mode that deviate in a predetermined manner from actions taken by the human operator are automatically annotated as mistakes in the ground-truth data;

analyzing the driving log using an automated autonomous driving evaluator to generate a report, wherein the automated autonomous driving evaluator is a computerized system that automatically analyzes driving logs to identify mistakes made by autonomous driving systems;

comparing automatically the report with the ground-truth data to generate a performance assessment for the automated autonomous driving evaluator; and providing the performance assessment to a development process in which the automated autonomous driving evaluator is modified based, at least in part, on the performance assessment to improve the performance of the automated autonomous driving evaluator;

wherein a vehicle is controlled using an autonomous driving system that has been corrected based on an analysis by the modified automated autonomous driving evaluator.

21. A system, comprising:

a processor; and a memory storing machine-readable instructions that, when executed by the processor, cause the processor to:

analyze, using an evaluator, a driving log to identify mistakes made by an autonomous driving system to generate a report of an analysis;

compare the report with ground-truth data to produce an assessment of the evaluator, wherein the ground-truth data includes at least one of human-initiated disengagements of the autonomous driving system and human-entered annotations indicating mistakes made by the autonomous driving system; and communicate the assessment to a development process that modifies the evaluator to improve the performance of the evaluator;

wherein a vehicle is controlled using an autonomous driving system that has been corrected based on an analysis by the modified evaluator.

* * * * *